US005232069A

United States Patent [19]
Siegrist

[11] Patent Number: 5,232,069
[45] Date of Patent: Aug. 3, 1993

[54] GREASE FITTING AND GREASE FITTING PLUG FOR WHEEL HUB

[75] Inventor: Rudolf Siegrist, Valley City, Ohio

[73] Assignee: MTD Products Inc., Cleveland, Ohio

[21] Appl. No.: 921,053

[22] Filed: Jul. 29, 1992

[51] Int. Cl.$^5$ .............................................. F01M 11/04
[52] U.S. Cl. .................... 184/105.3; 384/286; 301/105.1; 301/108.1
[58] Field of Search ............... 184/105.3; 384/286, 384/322, 474; 301/105.1, 108.1–108.5

[56] References Cited
U.S. PATENT DOCUMENTS

| 2,546,642 | 3/1951 | Le Clair | 184/105.3 |
| 2,608,402 | 8/1952 | Searle | 184/105.3 |
| 3,542,155 | 11/1970 | Kern | 184/105.3 |

FOREIGN PATENT DOCUMENTS

| 1048448 | 1/1959 | Fed. Rep. of Germany ... 184/105.3 |
| 988988 | 9/1951 | France ............................. 184/105.3 |

Primary Examiner—Thomas E. Denion
Attorney, Agent, or Firm—Woodling, Krost & Rust

[57] ABSTRACT

Grease fittings are disclosed for insertion in a bore extending through the wall of a wheel hub to direct grease into the interior of the wheel hub. The grease fitting is shaped for secure seating on the hub, for easy and rapid insertion into the boreand for securing it in the threadless bore. A second embodiment includes a grease fitting plug for insertion in a bore extending through the wall of a wheel hub wherein the grease fitting plug is shaped to be securely seated on the hub and securely mounted in the threadless bore.

19 Claims, 7 Drawing Sheets

GREASE FITTING AND GREASE FITTING PLUG FOR WHEEL HUB

FIELD OF THE INVENTION

This invention relates to a grease fitting for a wheel hub, and more particularly, to a plastic grease fitting which is easily and quickly installed in a wheel hub. A grease fitting plug is also disclosed which can installed in the hub when desired.

BACKGROUND OF THE INVENTION

Grease fittings constructed of metal are conventionally inserted in threaded bores extending through wheel hubs, as illustrated in FIG. 1 herein, for attachment to a grease applicator, such as a grease gun, to inject grease through the fitting and into the hub for lubricating bearings disposed therein. The threaded bores and the metal grease fittings add a significant extra expense to a completed wheel hub because of the extra cost for material and time required for manufacturing and assembly.

Depending on the application and manufacturing specifications, a standard wheel hub might or might not be fitted with a grease fitting. To reduce manufacturing costs, only those wheel hubs needing grease fittings are manufactured with threaded bores for grease fittings. When a grease fitting is not to be utilized, no bore is incorporated into the hub. This frequently results in a dual inventory of hubs with fittings and those without. For hubs with grease fittings, assembling the threaded fitting into the bore also adds a significant manufacturing and assembly expense.

OBJECTS AND SUMMARY OF THE INVENTION

It is an object of the present invention to provide a grease fitting and a grease fitting plug for insertion within a non-threaded bore in a wheel hub which obviates the problems and limitations of the prior art devices including the need for dual inventory. This reduces the costs including manufacturing, inventory and repair costs.

It is another object of the present invention to provide a grease fitting and a grease fitting plug for insertion into a bore in a wheel hub for which are relatively inexpensive to manufacture and assemble.

It is yet another object of the present invention to provide a grease fitting and a grease fitting plug for easy, rapid insertion within a bore in a wheel hub.

It is still another object of the present invention to provide a hand tool and method of using the hand tool for inserting a grease fitting into a bore in a wheel hub.

In accordance with the invention, a grease fitting is adapted to be inserted in a bore, preferably threadless, extending through the wall of a cylindrical sleeve incorporated in a wheel hub for directing grease into an interior portion of the wheel hub. The grease fitting has a support base with a bottom surface having a radius of curvature substantially equal to the radius of curvature of the outer surface of cylindrical sleeve whereby the support base can be securely seated on the sleeve. Further, the grease fitting includes structure for gripping the grease fitting and readily inserting it into the bore and for securing the grease fitting therein.

Further, in accordance with the invention, a grease fitting plug is adapted to be inserted in a bore extending through the wall of a cylindrical sleeve to provide access to the interior of a wheel hub. The grease fitting plug has a support base with an upper surface and a bottom surface. The bottom surface has a radius of curvature substantially equal to the radius of curvature of the cylindrical sleeve whereby the support base can be securely seated on the sleeve. Also, the grease fitting plug can be securely mounted in the bore.

Moreover, in accordance with the invention, a grease fitting is adapted to be inserted in a bore extending through the wall of a cylindrical sleeve incorporated in a wheel hub for directing grease into an interior portion of the wheel hub. The grease fitting has a support base with a bottom surface having a radius of curvature substantially equal to the radius of curvature of the exterior surface of the cylindrical sleeve whereby the support base can be securely seated on the sleeve. The grease fitting also includes structure for gripping and inserting the grease fitting into the bore, for securing the grease fitting in the bore and for enabling grease to flow in one direction through the grease fitting.

BRIEF DESCRIPTION OF THE DRAWINGS

The structure, operation, and advantages of the presently preferred embodiment of the invention will become further apparent upon consideration of the following description taken in conjunction with the accompanying drawings, wherein.

DETAILED DESCRIPTION OF THE INVENTION

Figure 1:
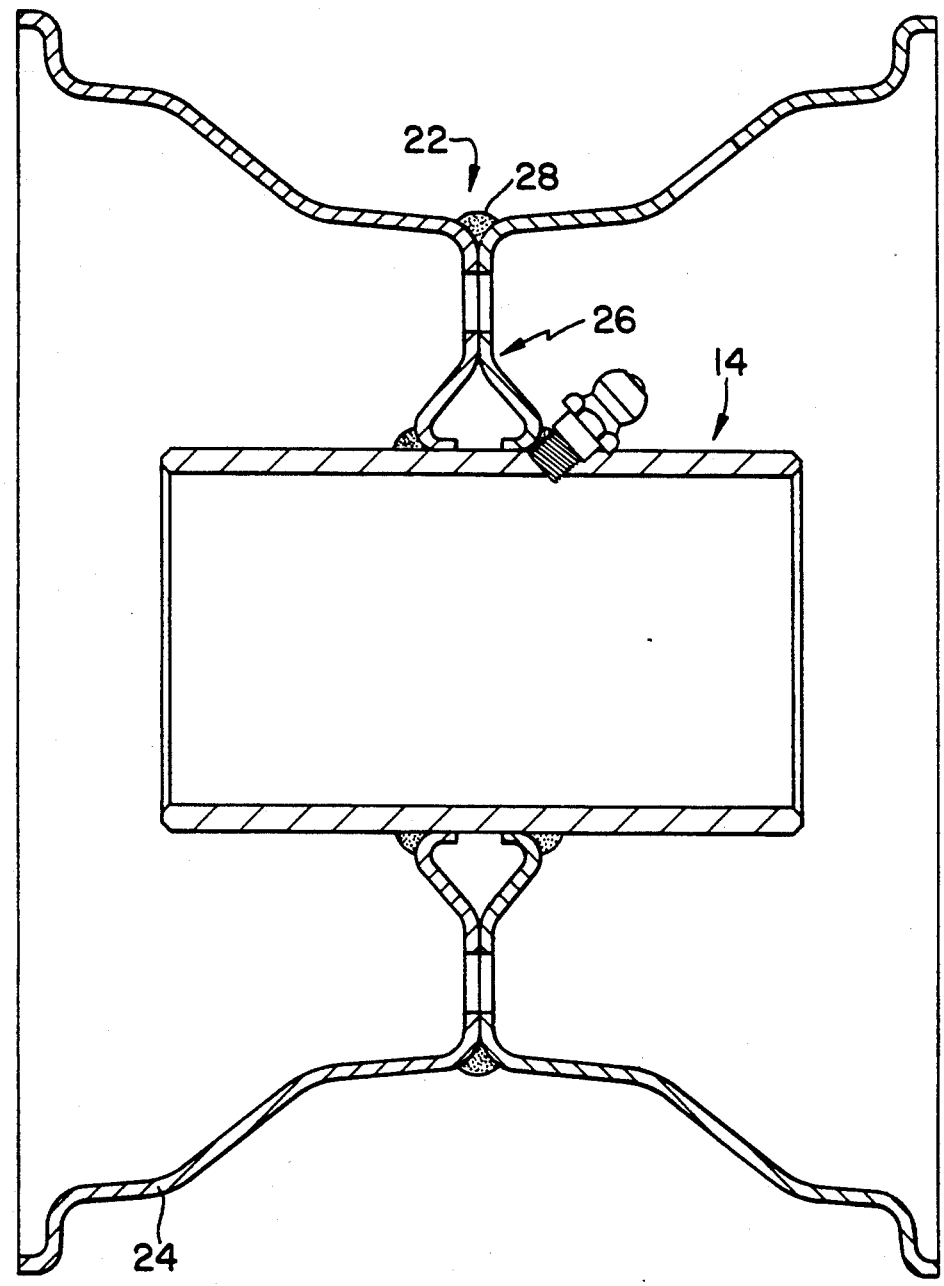
FIG. 1 is a side elevational view in cross section of a prior art grease fitting inserted in a bore through a wheel hub.
Figure 2:
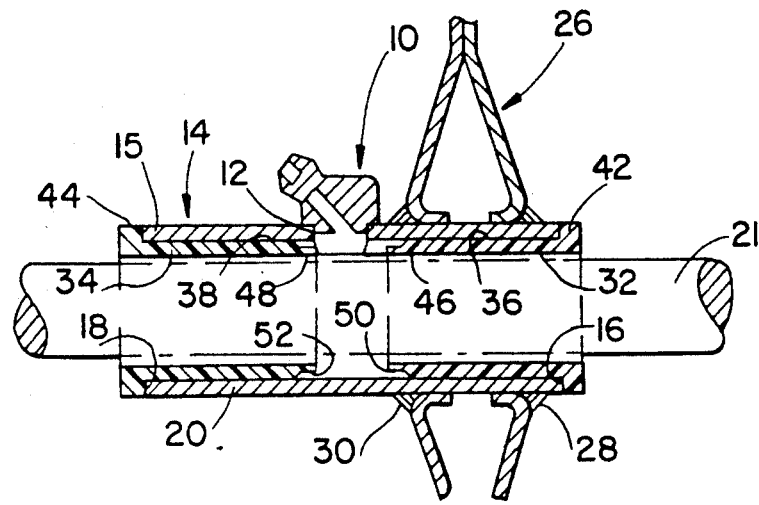
FIG. 2 is a side elevational view, in cross section, of a grease fitting inserted in a bore through a wheel hub in accordance with the present invention.

Referring to FIG. 2, a grease fitting 10 is shown inserted in a bore 12 through a wheel hub 14 in accordance with the present invention. The wheel hub 14 includes a wheel hub cylindrical sleeve 15 open at either end 16 and 18 and having through bore 12 extending through wall 20. An axle 21, illustrated in phantom in FIG. 2, can be disposed within the wheel hub sleeve 15. A wheel rim 22 adapted to have a tire mounted thereon, as illustrated in FIG. 1, does not form any part of this invention per se, and is described only briefly herein. The rim 22 has a generally, cylindrically shaped wall 24 to mount a tire (not shown) thereon. A disk-shaped, support web 26 projects radially inward from the wall 24 and has a free end forming a cylindrical surface which is secured to hub 14 by any desired means, such as weldments 28 and 30. It is also within the terms of the invention to construct the wheel rim support web and wheel hub assembly from stampings and/or castings and of any desired material including metal or plastic.

The invention is suitable for any type of grease fitting application with a rotary shaft inside a stationary housing, a rotary material between concentric parts and all wheel hubs. For example, as illustrated in FIG. 2, cylindrically shaped, insert bearing 32 and 34 are disposed within the wheel hub 14. Insert bearings 32 and 34 have outer circumferential surfaces 36 and 38, respectively, engaging a concentric, inner, circumferential surface 40 of cylinder 15. Each of the insert bearings has an outwardly extending lip 42 and 44, at one end, which abuts against the ends 16 and 18 of cylinder 15 to position the inserts therein. At the other end of the insert bearings, terminal sections 46 and 48 are provided with outer circumferential surfaces 50 and 52, each with a smaller diameter then the diameter of the outer circumferential surfaces 36 and 38 and the diameter of the inner surface 40 of cylinder 15. The insert bearings 32 and 34 can be easily inserted into the open ends 16 and 18 of the hub 14 and pressed inwardly until their outwardly extending lips 42 and 44 abut against the ends of cylinder 15. The insert bearings are secured within cylinder 15 by any conventional means, such as by an interference frictional fit between the outer circumferential surface of the insert bearings and the inner circumferential surface 40 of cylinder 15. The insert bearings 32 and 34 can be constructed of any suitable bearing material such as plastic. Alternatively, other type bearings, such as a ball and roller bearing, and materials for such bearings, such as steel, are suitable.

Figure 3:
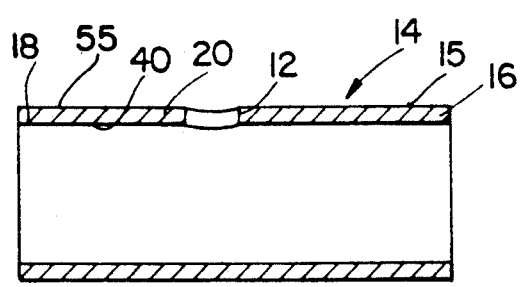
FIG. 3 is a side elevational view, in cross section, of a wheel hub with a bore therethrough adapted to receive a grease fitting in accordance with the present invention.
Figure 3A:
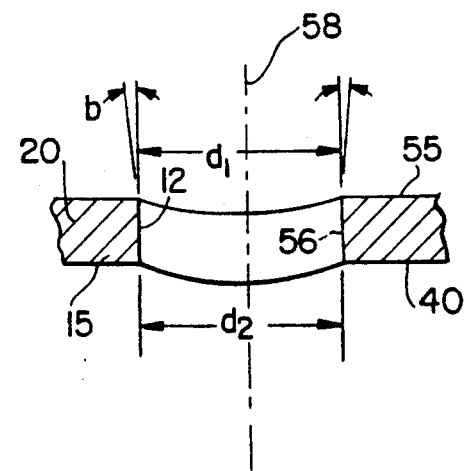
FIG. 3A is an enlarged fragmentary, cross-sectional, side elevational view of the bore through the wheel hub of FIG. 3.
Figure 4:
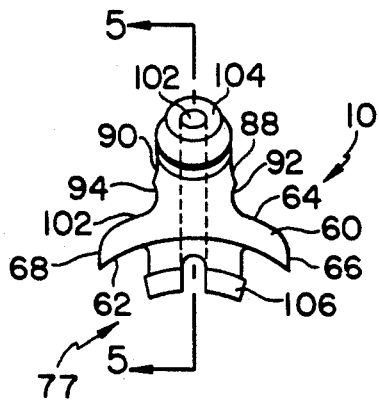
FIG. 4 is an enlarged, front elevational view of a grease fitting in accordance with the present invention.
Figure 5:
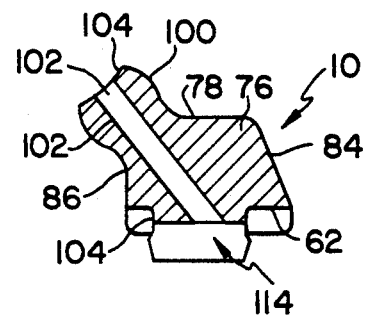
FIG. 5 is a view in cross section through line 5—5 of FIG. 4.

The cylinder 15, as illustrated in FIGS. 3 and 3A has a bore 12, preferably non-threaded, extending from the outer, circumferential surface 55 to the inner circumferential surface 40 through the wall 20. The sidewall 56 of bore 12 flares outwardly, with respect to a line parallel to centerline 58 through the center of the bore 12, at an angle "b" of about 5 degrees to about 15 degrees and preferably at an angle of about 10 degrees. Thus, the diameter d1 of the bore 12 at the outer surface of wall 20 is larger than the diameter d2 of the bore 12 at the inner surface of wall 20 to facilitate insertion of the grease fitting. While a flared bore is preferable, it is also within the scope of the invention to form the bore with straight sidewalls. The bore 12 is preferably formed by punching or drilling. The design features of bore 12, i.e. the flared shape, the smooth surface of bore wall 56 and the thickness of the cylinder wall 20, are important because they effect the design of the grease fitting 10 and the ease with which the fitting can be quickly inserted and securely mounted to cylindrical sleeve 15, as discussed hereinafter.

Figure 6:
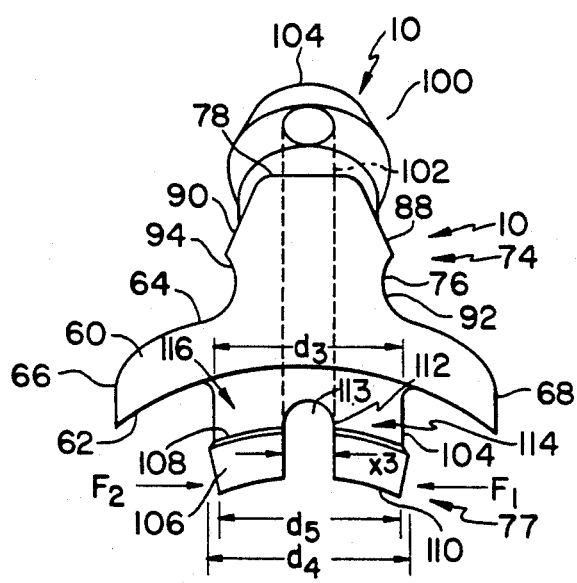
FIG. 6 is an enlarged, rear elevational view of a grease fitting in accordance with the present invention.
Figure 7:
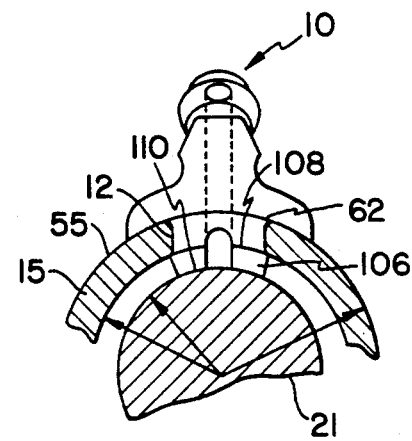
FIG. 7 is an enlarged, cross-sectional, side elevation view of a grease fitting mounted in the bore of a wheel hub.
Figure 6A:
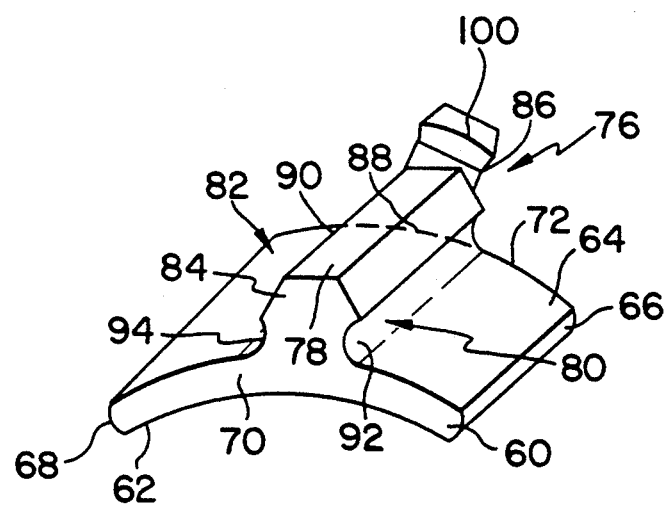
FIG. 6A is an enlarged, isometric view of a grease fitting in accordance with the present invention.

Referring to FIGS. 4, 5, 6, 6A and 7, there is illustrated grease fitting 10 which is easily and quickly mounted into the bore 12 in cylindrical sleeve 15. Preferably, the grease fitting 10 is a part constructed from a molded material, such as plastic, and thus is inexpensive and easy to manufacture and install. Grease fitting 10 has a support base 60 with a generally rectangular shape. Other shaped support bases could also be used. Support base 60 includes a bottom surface 62 with a concave curvature having a radius of curvature substantially identical to the radius of curvature of the outer cylindrical surface 55 of cylindrical sleeve 15, as illustrated in FIG. 7. The preferred size of surface 62 is substantially larger then the diameter of bore 12 to aid in the sealing of the bore. Support base 60 has an upper surface 64, preferably with a curvature substantially the same as the curvature of bottom surface 62 so as to have a good external appearance. Curved surfaces 66 and 68, at opposite sides of base 60, extend the width thereof and intersect the upper surface 64 and the lower surface 62. Front and rear end walls 70 and 72 connecting the upper and lower surfaces, 64 and 62, extend substantially perpendicular thereto, as shown in FIG. 6A.

Figure 12:
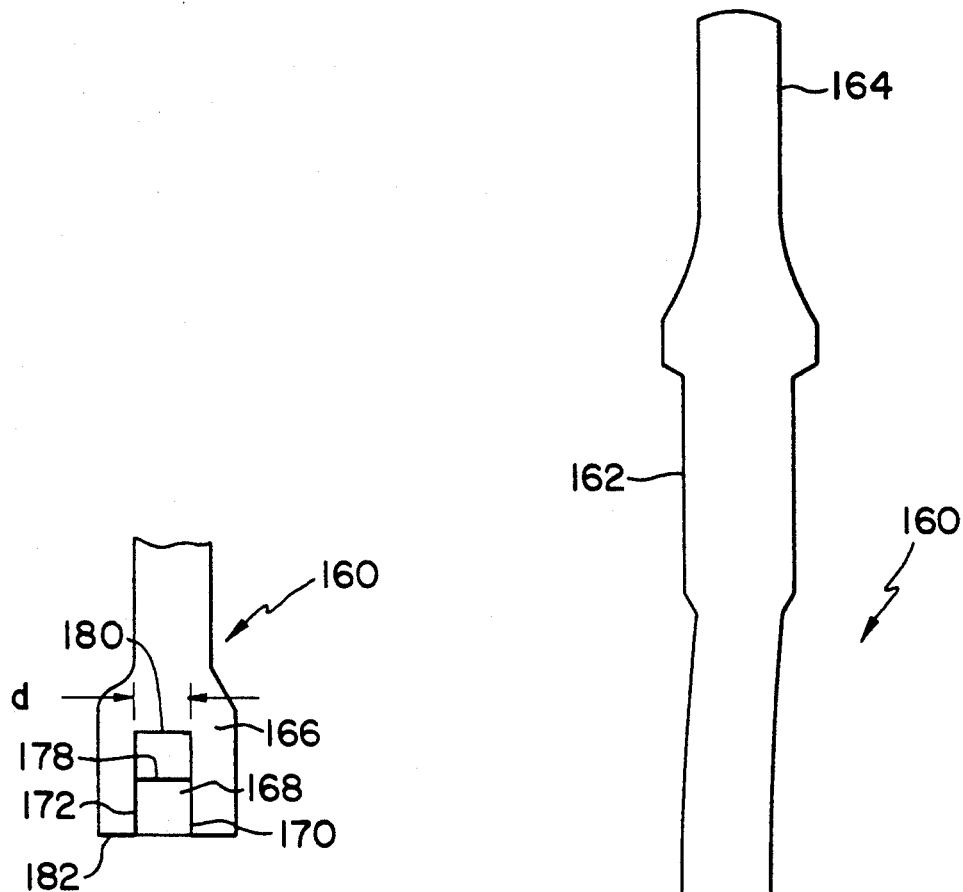
FIG. 12 is a view, in cross section, through line 12—12 of FIG. 11.
Figure 11:
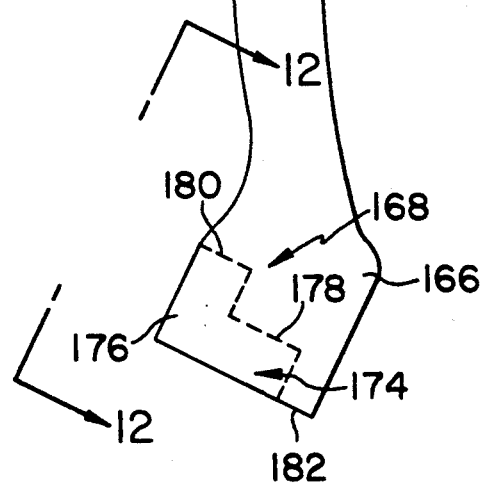
FIG. 11 is a side view of a tool for inserting a grease fitting into the bore of a wheel hub.
Figure 13:
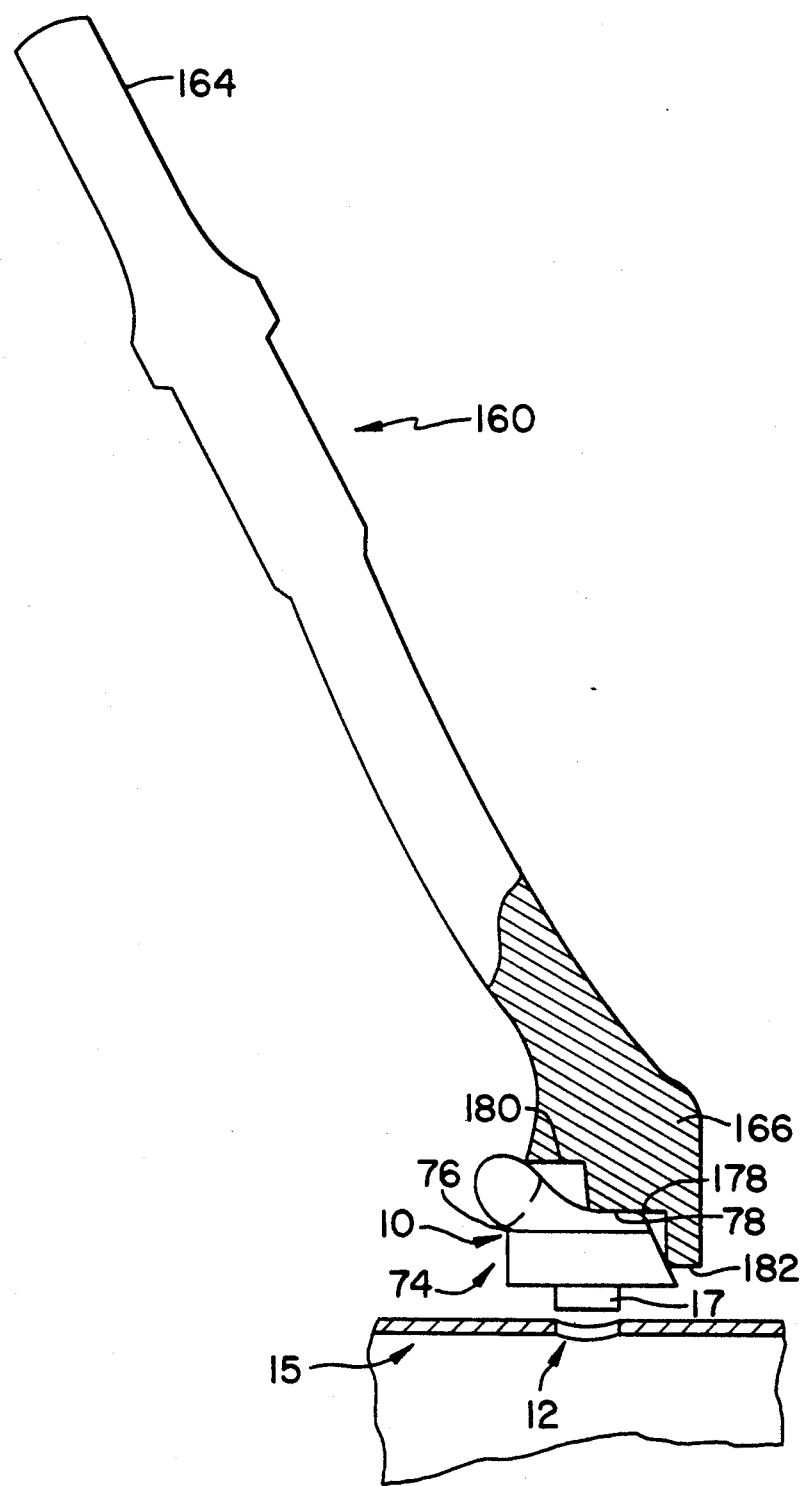
FIG. 13 is a side view, partly in cross section of a tool inserting a grease fitting into the bore of a wheel hub.

Grease fitting 10 also has means 74 for gripping the grease fitting with a mounting tool 160, as illustrated in FIGS. 11, 12 and 13, to facilitate insertion of the grease fitting into bore 12. Means 74 includes a boss 76 projecting upwardly from upper surface 64 and preferably formed as a unitary construction with base 60 and bottom surface 62 which is generally parallel to the boss 76 to aid in the axial insertion of fitting 10 by a tool 160 into the bore 12. Grease fitting 10 further includes a means 75 for securing the grease fitting within bore 12. Means 75 includes a ferrule 77 projecting downward from lower surface 62 and preferably formed as a unitary construction with base 60.

Boss 76 extends substantially across the width of base 60 and has a substantially flat, upper surface 78, side walls 80 and 82 between the upper surface 64 of the support base and the upper surface 78 of boss 76 extending the width of support base 60 and opposite end surfaces 84 and 86. The side walls 80 and 82 include bevelled sections 88 and 90, extending the width of the side walls and intersecting the upper surface 78. The side walls 80 and 82 also include concave, curved sections 92 and 94 extending the width of the side walls and intersecting the upper surface 64 of base support 60 and bevelled sections 88 and 90. Opposite end surfaces 84 and 86 are bevelled inwardly beginning from the upper surface 64 of the support base to the upper surface 78 of the boss. The shape and orientation of the boss 76 enables the grease fitting 10 to be quickly and easily installed as discussed hereinafter.

Projecting outward from end surface 86 is a mammillated post 100. Post 100 has an outer shaped surface that is suitable to attach a conventional grease gun for injecting grease into a bore 102 extending through grease fitting 10. Bore 102 opens at face surface 104 of post 100 and extends substantially straight through post 100, boss 76 and support base 60.

Ferrule 77, which projects downward from lower surface 62 of support base 60, secures grease fitting 10 within bore 12 through wall 20 of wheel hub sleeve 15. Ferrule 77 has a cylindrically shaped base 104 which protrudes downward from lower base surface 62 of support base 60. The diameter d3 of base 104 is preferably slightly larger or substantially equal to the diameter d2 of bore 12 so that when ferrule 77 is inserted within bore 12, it is snugly held into position by the slight interference or tight fit between ferrule 77 and bore 12. The interference or tight fit between the ferrule 77 and bore 12 is important because it provides a seal to prevent the leakage of grease therebetween. Cylindrical base 104 terminates in a collar 106 wherein the intersection 108 of collar 106 with base 104 has a diameter d4 which is larger than the diameter d1 of bore 12. The intersection 108 of collar 106 with base 104 is spaced from the base surface 62 a distance, preferably slightly less than the thickness of wall 20 of wheel hub sleeve 15. Then, when the ferrule 77 is inserted into the bore 12, a invention force pulls the bottom surface 62 against the outer cylindrical surface 55 of cylindrical sleeve 15 to insure that the support base 60 is in full contact with the wheel hub sleeve 15. It is also within the terms of the invention for the intersection 108 of collar 106 with base 104 to be spaced from the base surface 62 a distance substantially equal to the thickness of wall 20 of wheel hub sleeve 15. The intersection 108 is preferably concentric and symmetrical with both the bottom surface 62 of base 60 and the outer facing surface 110 of collar 106. This provides for a relatively uniform and secure holding force. The diameter d5 of outer surface 110 is less than the diameter d1 of bore 12 to allow for easy insertion of ferrule 77 into the outwardly flared opening of bore 12, as discussed hereinafter. It is also within the terms of the invention to form the bore 12 with a straight surface, as previously mentioned. The invention can even be used with a threaded bore as a retrofit or repair. Further, the radius of curvature of outer surface 110 is preferably spaced from and substantially identical to the radius of curvature of axle 21 to prevent any interference with the rotation thereof.

Another important design aspect of grease fitting 10 is that base 104 and the collar 106 of ferrule 77 preferably have an arched notch 112 opening at the outer facing surface 110 and extending to an arched section 113 intermediate the cylindrical base 104. The notch 112 extends completely through the ferrule 77 and divides the base 104 and collar 106 into two portions 114 and 116 separated by a gap "x" which can be made smaller if forces F1 and F2 are applied on either portion 114 and 116, as illustrated in FIG. 6. Preferably, the gap "x" is made as small as possible while still permitting insertion of ferrule 77 into bore 12. The pressure applied allows the grease fitting 10 to be inserted into the threadless bore 112 with a larger diameter intersection 108 than otherwise. When the grease fitting is in place, the portions 114 and 116 spring back. Since the diameter of the ferrule is preferably slightly larger than the diameter of the bore, the outward force of the portions 114 and 116 springs back against the bore 114, This aids in holding the fitting 10 in place.

To assemble the grease fitting 10 into bore 12, a tool 160, as illustrated in FIGS. 11-13 securely grips the grease fitting 10 for insertion into bore 12. The tool 160 has an elongated handle 162, suitable for manually holding the tool, with a receiver portion 164 at one end and a gripping head 166 at the other end. The receiver portion 164 is preferably adapted to apply a longitudinal force directed through the handle to the gripping head 166 so as to press the grease fitting 10 into bore 12. It is also within the terms of the invention to apply the force by other means such as striking the receiver portion with a hammer or applying a force otherwise than directly by hand.

The gripping head has a slot 168 with side walls 170 and 172 separated by a distance "d" which is approximately equal to the width of the boss 76 between the side walls 80 and 82. Referring to FIG. 6, the width of boss 76 is preferably between the intersection of curved sections 92 and 94 and the bevelled sections 88 and 90, respectively, so that the fitting 10 is snugly gripped therein, as illustrated in FIG. 13. Slot 168 has a stepped sections 174 and 176. The section 174 has an upper surface 178 which abuts against the flat upper surface 78 of the boss 76 and exerts the downward force which drives the ferrule 77 into bore 12. Section 176 has an upper surface 180 which is spaced from the surface 178 to allow the boss 76 to abut against upper surface 178. Further, the upper surface 180 is spaced from the end surface 182 of the tool so that the end surface abuts against the cylinder 15 prior to the upper surface 180 directing force against the mammillated post 100.

To insert grease fitting 10 into bore 12 with tool 160, the grease fitting is first placed in slot 168 of the tool, as discussed above. Then, the ferrule 77 is aligned with the bore 12. The collar 106 having an outer face diameter d5 is then inserted into the bore 12. As fitting 10 is pressed into bore 12 by the action of pushing the tool towards the bore, the portions 114 and 116 of collar 106 and cylindrical base 104 are pressed towards each other by the forces generated from the interference with the side wall of bore 12. When the sleeve 14 is finally seated with the cylindrical sleeve 15 disposed snugly between the lower surface 62 of support base 60 and the intersection 108 of collar 106, the portions 114 and 116 snap back to their normal position, as illustrated in FIGS. 4-7, and a downward force due to the intersection 108 of collar 106 with base 104 being spaced from the base surface 62 a distance, preferably slightly less than the thickness of wall 20 of wheel hub sleeve 15, causes the fitting 10 to be firmly secured within the bore 12. The tool is then simply slid off of the boss 76.

The above described embodiment of the invention provides a very effective, inexpensive and rapid means of inserting and securing a grease fitting into a bore through a wall of a wheel hub sleeve. The insertion can be accomplished by a hand tool, such as tool 160 without the need for complex tapping. Also, the fitting can inexpensively molded of a material such as plastic. Once the fitting is in place, it seals the bore. In the event that the fitting is damaged or otherwise is inoperable, it can be easily removed and replaced with a new fitting.

Figure 8:
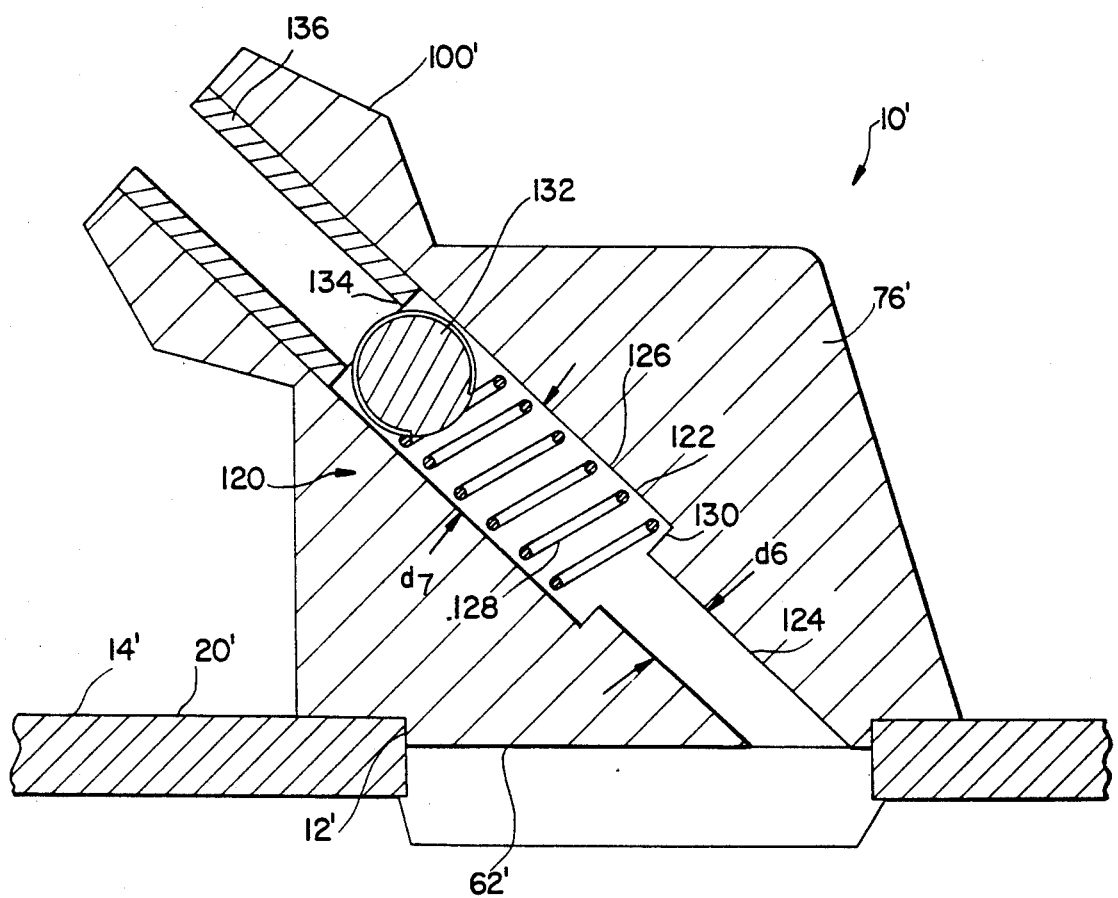
FIG. 8 is an enlarged, cross-sectional, side elevation view of a second embodiment of a grease fitting mounted in the bore of a wheel hub.

It is also within the terms of the invention to provide an alternative embodiment, as illustrated in FIG. 8, wherein a valve means 120 is provided to enable grease to flow in only one direction through the grease fitting, e.g., through a modified bore 122, through boss 76' and mammillated post 100' in a grease fitting 10'. Primed and double primed numbers indicate elements which are substantially identical to the elements identified throughout the specification by the same unprimed number. Bore 122 has a first section 124 within boss 76' with a first diameter d6 opening at lower surface 62' and an adjoining, intersecting second section 126 with a second diameter d7 which is larger than diameter d6. A compression spring 128 is disposed in bore section 126 and is seated against the shoulder 130 formed between the bore sections 124 and 126. A valve ball 132 is disposed against the spring 128 and seated against a valve seat 134 provided at one end of a sleeve 136 disposed within the bore 122 in the mammillated post 100'.

In assembling grease fitting 10' with a valve means 120, the spring 128 is first inserted into bore section 126. Then, the ball 132 is inserted into the open end of section 126 of bore 122 until it rests against spring 128. Next, sleeve 136 is inserted into the open end of bore 122 and pressed against the ball 132 to compress spring 128 and thereby insure that ball 132 seals against seat 134 at the end of sleeve 136 whenever grease is not being delivered through grease fitting 10'. The sleeve 136 can be secured within the bore 122 by any desired means, such as by heating to a temperature where the sleeve merges together with the grease body or joining with an adhesive.

The grease fitting 10' is inserted within a bore 12' of a bearing hub sleeve 14', in the manner described hereinbefore with regard to the first embodiment illustrated in FIGS. 2 and 4–7. The alternative embodiment of FIG. 8 is particularly advantageous, for example, when greater quantities of grease are require, in higher temperature applications and in higher pressure applications when the bearings have seals.

Figure 9:
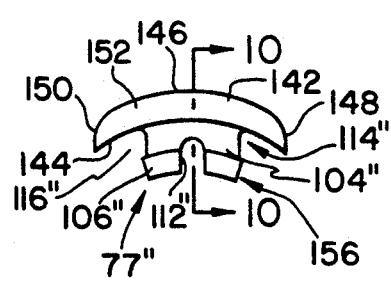
FIG. 9 is an enlarged, front elevational view of a plug in accordance with the present invention.
Figure 10:
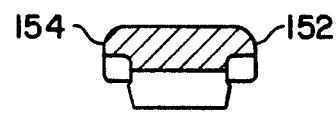
FIG. 10 is a view, in cross section, through line 10—10 of FIG. 9.

While the above described embodiments of the invention provide a very effective, inexpensive and rapid means of securing a grease fitting into a bore through a wall of a sleeve, it is also within the terms of the invention to provide an alternative embodiment, as illustrated in FIGS. 9 and 10, wherein a grease fitting plug 140 is provided for insertion into a threadless bore 12 of wheel hub sleeve 15 where grease replenishment is not desired. In certain devices, the provision of a grease fitting may not be required or desired. However, to lower manufacturing cost, standardized wheel hubs may be provided with bores 12 to optionally accommodate a grease fitting when specified. This is particularly advantageous so that only a single inventory of wheel hubs is required. Then, depending on the needs of each customer, the appropriate number and type of grease fittings can be installed into bore 12. Preferably, the grease fitting plug 140 is again constructed from a material, such as plastic, which is inexpensive and easy to manufacture and install.

The grease fitting plug 140 has a support base 142 with a generally rectangular shape. Support base 142 comprises a bottom surface 144 with a concave curvature having a radius of curvature substantially identical to the radius of curvature of wheel hub sleeve 15 and an upper surface 146, preferably with a curvature substantially the same as the curvature of bottom surface 144. Curved end surfaces 148 and 150 and curved side surfaces 152 and 154 intersect and connect the upper surface 146 and the lower surface 144. Means 156 for securing grease fitting 10 into bore 12 includes a ferrule 77" projecting downward from lower surface 144 preferably formed as a unitary construction with base 142.

Ferrule 77", which projects downward from lower surface 144, secures grease fitting plug 140 within bore 12 through wall 20 of wheel hub sleeve 14. Ferrule 77" has a cylindrical base 104" which protrudes downward from lower surface 144 support base 142. The diameter d3 of base 104" is preferably slightly greater than the diameter d2 of bore 12 so that when the ferrule is inserted within bore 12, it is snugly held into position by the interference fit between ferrule 77" and bore 12. Alternatively, the diameter d3 of base 104" is substantially equal to the diameter d2 of bore 12 so that the ferrule is snugly held into position by the close fit between ferrule 77" and bore 12. Cylindrical base 104" terminates in a collar 106" with the same dimensions and spacial relationships with the sleeve 15 and bore 12 as previously discussed regarding the ferrule 77 of the first embodiment.

In addition, the ferrule 77" includes an arched notch 112" which divides the ferrule 77" into two portions 114" and 116". Pressure applied against the portions 114" and 116" enables grease fitting plug 140 to be easily inserted into the threadless bore 12 by simply inserting the end of ferrule 77" into bore 12 and pressing against the upper surface 146 until plug 140 is secured within bore 12, as previously explained, regarding the insertion of ferrule 77 within bore 12 above. Where necessary, the grease fitting plug 140 can easily be replaced with a grease fitting 10, or vice versa.

It is apparent that there has been provided in accordance with this invention a grease fitting and a grease fitting plug for insertion in a bore through a sleeve of a wheel hub that satisfy the objects, means and advantages set forth hereinbefore.

While the invention has been described in combination with embodiments thereof, it is evident that many alternatives, modifications, and variations will be apparent to those skilled in the art in light of the foregoing description. Accordingly, it is intended to embrace all such alternatives, modifications and variations as fall within the spirit and scope of the appended claims.

We claim:

1. A grease fitting adapted to be inserted in a bore extending through a wall of a cylindrical sleeve of a wheel hub for directing grease into an interior portion of said wheel hub, comprising:

said grease fitting having a support base with a bottom surface having a radius of curvature substantially equal to the radius of curvature of an outer surface of said cylindrical sleeve whereby said support base is firmly seated on said sleeve in full contact therewith;

means for gripping said grease fitting whereby said grease fitting is readily inserted into said bore; and means for securing said grease fitting in said bore.

2. The grease fitting as defined in claim 1 wherein said means for securing said grease fitting in said bore includes a ferrule having a cylindrical base with a diameter substantially equal to the diameter of said bore and a length substantially equal to the thickness of said wall, said base terminating in a collar having a diameter which is larger than the diameter of said bore so that said wall is confined between said support base and said collar.

3. The grease fitting as defined in claim 2 wherein said ferrule further includes a notch extending partially therethrough to divide said ferrule into two portions which are pressed together when said collar is inserted in said bore and which snap back to a normal position after said bottom surface of said support base is seated against said sleeve.

4. The grease fitting as defined in claim 3 wherein said collar has an outer facing surface with a first diameter which is less than said diameter of said bore so that said ferrule is readily inserted into said bore and sidewalls of said bore presses said two portions of said ferrule together as said ferrule is pressed into said bore.

5. The grease fitting as defined in claim 4 wherein said collar has a second diameter which is larger than the diameter of said bore at a line of intersection with said cylindrical base and said line of intersection has a radius of curvature substantially equal to the radius of curvature of an interior surface of said cylindrical sleeve whereby said collar is securely seated against said interior surface of said sleeve.

6. The grease fitting as defined in claim 1 wherein said means for gripping said grease comprises a boss projecting upward from said base, said boss having a flat upper surface connected to said base by first and second side walls and first and second end walls, said side walls each having a concave curved section adapted to be gripped in conjunction with said flat upper surface to insert said grease fitting into said bore.

7. The grease fitting as defined in claim 2 wherein said means for gripping said grease fitting comprises a boss projecting upward from said base, said boss having a flat upper surface connected to said base by first and second side walls and first and second end walls, said side walls each having a concave curved section adapted to be gripped in conjunction with said flat upper surface to insert said ferrule into said bore.

8. The grease fitting as defined in claim 7 further including a mammillated post projecting outward from said first end wall, and a grease delivery bore extending through said mammillated post, said boss, said support base and said ferrule adapted for delivering grease to the interior portion of said wheel hub.

9. The grease fitting as defined in claim 8 further including a valve means within said grease delivery bore.

10. The grease fitting as defined in claim 9 wherein said valve means includes a compression spring disposed in said grease delivery bore, a valve element in said delivery bore disposed against said spring and a valve seat in said delivery bore located on another side of said valve element from said spring whereby said spring is compressed to seat the valve element against the valve seat whenever grease is not being delivered through said delivery bore.

11. A grease fitting plug adapted to be inserted in a bore extending through the wall of a cylindrical sleeve to the interior of a wheel hub, comprising:
said grease fitting plug having a support base with an upper surface and a bottom surface, said bottom surface having a radius of curvature substantially equal to the radius of curvature of an outer surface of said cylindrical sleeve whereby said support base is securely seated on said sleeve in full contact therewith and means for securing said grease fitting plug in said bore.

12. The grease fitting plug as defined in claim 11 wherein said means for securing said grease fitting plug in said bore includes a ferrule having a cylindrical base with a diameter substantially equal to the diameter of said bore and a length substantially equal to the thickness of said wall, said base terminating in a collar having a diameter which is larger than the diameter of said bore so that said wall is confined between said support base and said collar.

13. The grease fitting plug as defined in claim 12 wherein said ferrule further includes a notch extending partially therethrough to divide said ferrule into two portions which is pressed together when said collar is inserted in said bore and which snap back to a normal position after said bottom surface of said support base is seated against said sleeve.

14. The grease fitting plug as defined in claim 13 wherein said collar has an outer facing surface with a first diameter which is less than said diameter of said bore so that said ferrule is readily inserted into said bore and sidewalls of said bore press said two portions of said ferrule together as said ferrule is pressed into said bore.

15. The grease fitting plug as defined in claim 14 wherein said collar has a second diameter which is larger than the diameter of said bore at a line of intersection with said cylindrical base and said line of intersection has a radius of curvature substantially equal to the radius of curvature of an interior surface of said cylindrical sleeve whereby said collar is securely seated against said interior surface of said sleeve.

16. A grease fitting adapted to be inserted in a bore extending through the wall of a cylindrical sleeve incorporated in a wheel hub for directing grease into an interior portion of said wheel hub, comprising:
said grease fitting having a support base with a bottom surface having a radius of curvature substantially equal to the radius of curvature of an outer surface of said cylindrical sleeve whereby said support base is securely seated on said sleeve in full contact therewith;
means for gripping said grease fitting whereby said grease fitting is readily inserted into said bore;
means for securing said grease fitting in said bore; and,
means for enabling grease to flow in one direction through said grease fitting.

17. The grease fitting as defined in claim 16 wherein said means for enabling grease flow includes a grease delivery bore extending through said grease fitting for delivering said grease to the interior portion of said wheel hub and a valve means within said grease delivery bore for enabling grease to flow in one direction through said grease fitting.

18. The grease fitting as defined in claim 17 wherein said valve means includes a compression spring disposed in said grease delivery bore, a valve element in said delivery bore disposed against said spring and a valve seat in said delivery bore located on another side of said valve element from said spring whereby said spring is compressed to seat said valve element against the valve seat whenever said grease is not being delivered through said delivery bore.

19. A method of inserting a grease fitting into a bore extending through a wall of a cylindrical sleeve for directing grease into the interior of said sleeve, comprising the steps of:
providing a grease fitting with a bottom surface having a radius of curvature substantially equal to the radius of curvature of an outer surface of said cylindrical sleeve, said grease fitting further having a ferrule projecting outward from said bottom surface and having a cylindrical base with a diameter substantially equal to the diameter of said bore for full contact therewith and a length substantially equal to the thickness of said wall, said base terminating in a collar having a diameter which is larger than the diameter of said bore;
gripping said grease fitting with a tool; and,
inserting said grease fitting into said bore until said wall of said cylindrical sleeve is secured between said support base and said collar and a fluid seal is formed between said grease fitting and said bore and between said bottom surface of said support base and said outer surface of said cylindrical sleeve.

* * * * *